June 25, 1935.  E. PYZEL  2,006,078
CATALYTIC CONVERTER
Filed March 23, 1932
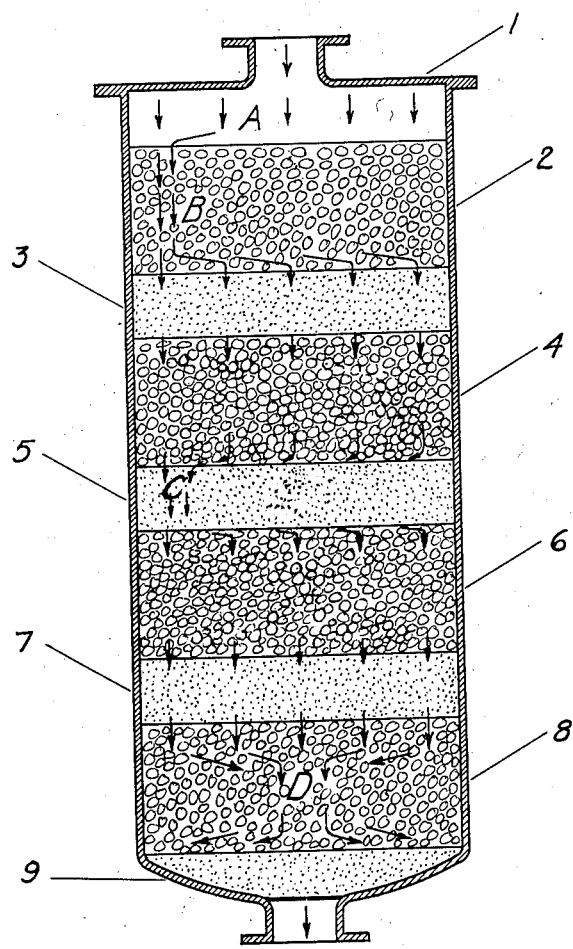
Inventor :- Ewald Pyzel
By His Attorney :-

Patented June 25, 1935

2,006,078

UNITED STATES PATENT OFFICE 2,006,078

CATALYTIC CONVERTER

Ewald Pyzel, Pittsburg, Calif., assignor to Shell Development Company, San Francisco, Calif., a corporation of Delaware Application March 23, 1932, Serial No. 600,668

3 Claims. (Cl. 23—288)

This invention relates to catalysts used for effecting chemical reaction between gases and is more particularly concerned with the prevention of channelling of the gases through solid catalysts.

In catalytic processes of the class described it is the usual practice to place the catalyst in a suitable container or converter and pass the gases through the catalytic mass.

The catalyst is generally broken into pieces of a comparatively uniform size. The particular size of the lumps of catalyst depends somewhat on the rate at which it is desired to pass the gases through the catalyst.

One disadvantage in the operation of catalyst filled converters is that channelling of the gases through the mass is difficult to prevent. This results in only part of the catalyst being used, a poorer contact between the gases and the catalyst with consequent lower percentage conversion to the product desired, and overloading of part of the catalytic mass.

Now I have found that the above disadvantages can be greatly reduced by filling the converter with alternate layers of comparatively coarse uniform particles of catalyst and layers of more fine uniform particles of catalyst.

As stated above the gases passing through the usual catalytic mass, tend to find a channel through the catalyst following the path of least resistance. Having found such a path the excessive flow of gases along this path will overload the catalytic mass and possibly carry part of the catalyst off as dust.

By filling the converter with alternate layers of coarse and fine catalyst any channelling that may tend to take place in the coarse layer is effectively checked by the fine layer, whereas conversely any gas channelling through the fine layer will be distributed in its passage through the coarse layer.

By the use of the word "fine" it should be understood that fine as opposed to coarse is meant.

The manner in which this takes place will be more clearly understood by reference to the accompanying drawing in which (1) represents a converter filled with layers of coarse catalyst (2), (4), (6) and (8) and layers of fine catalyst (3), (5), (7) and (9). The gases to be synthesized enter the converter from the top and leave by the bottom.

Before contacting with the catalyst the gases at A are at a uniform pressure and flow at a uniform velocity.

Suppose for the purpose of explanation that the resistance in areas B, C and D is the least, the major part of the gas will then tend to pass through the first coarse layer (2) by area (B). Upon reaching the fine layer (3) the gas which has passed through area (B) will be distributed laterally across the converter owing to the greater resistance of the finely divided catalyst.

Channelling is shown as taking place in area (C) in fine layer (5). Gas which has passed through area (C) is distributed upon reaching coarse layer (6) owing to the decreased resistance to the passage of gas in the coarse layer. Channelling in area (D) of coarse layer (8) is broken up by the fine layer (9).

No channelling is shown as taking place in layers (3), (4), (6), (7) and (9) but as will be readily understood, channelling may take place in these layers.

The advantages of this arrangement will at once be apparent. The more uniform distribution of the load throughout the converter results in a more uniform temperature, longer life of the catalyst at a greater capacity of the converter as well as a longer time of contact between the gases and the catalyst and consequent better percentage conversion.

My invention is especially of use in high pressure chemical processes such as used for the manufacture of ammonia, methane and methanol.

I claim as my invention:

1. A catalytic converter for the synthesis of gases under high pressure comprising a converter shell, at least three alternate layers of coarsely divided uniform catalyst and finely divided uniform catalyst of the same chemical composition, said layers of catalyst being arranged transverse to the gas flow through said converter and in contact with one another.

2. A process of conducting a chemical reaction between reactants in the vapor phase in the presence of a catalyst which comprises flowing said reactants, under reaction conditions, transversely through at least three alternate layers of coarsely divided catalyst and finely divided catalyst of the same chemical composition in contact with each other.

3. A process of conducting a chemical reaction between reactants in the vapor phase in the presence of a catalyst which comprises flowing said reactants, under reaction conditions, transversely through at least three alternate layers of coarsely divided catalyst and finely divided catalyst of the same chemical composition in contact with each other, the reactants first flowing through a layer of coarsely divided catalysts.

EWALD PYZEL.